United States Patent [19]
Preziosa

[11] Patent Number: 5,297,892
[45] Date of Patent: Mar. 29, 1994

[54] STRIP FOR JOINING TWO PIECES OF WOOD

[76] Inventor: Christian Preziosa, 6 rue Ambroise de St. Pol., Pezy 28150-Voves, France

[21] Appl. No.: 930,241
[22] Filed: Aug. 13, 1992
[30] Foreign Application Priority Data Aug. 13, 1991 [FR] France ............... 91 10453

[51] Int. Cl.⁵ ............................................. F16B 12/00
[52] U.S. Cl. .................... 403/406.1; 403/231; 403/230; 403/405.1
[58] Field of Search .......... 403/407.1, 406.1, 405.1, 403/231, 230; 52/715, 765, 775, 780, 712, 704; 411/920, 457, 458

[56] References Cited

U.S. PATENT DOCUMENTS

| | | | |
|---|---|---|---|
| 1,407,582 | 2/1922 | Schneider | 411/457 |
| 1,998,251 | 4/1935 | Pool | 411/920 |
| 2,200,649 | 5/1940 | Wardle | 411/458 |
| 3,999,356 | 12/1976 | Packman | 52/765 |
| 5,015,135 | 5/1991 | Chamings | 411/457 |

FOREIGN PATENT DOCUMENTS

| | | |
|---|---|---|
| 2263410 | 10/1975 | France . |
| 944184 | 12/1963 | United Kingdom . |
| 1000015 | 8/1965 | United Kingdom . |

*Primary Examiner*—Randolph A. Reese
*Assistant Examiner*—Anthony Knight
*Attorney, Agent, or Firm*—Herbert Dubno; Andrew Wilford

[57] ABSTRACT

An edge of a first piece of wood is secured in a groove formed in a second piece by a joining strip of U-section with a base and a pair of sides projecting from outer edges of the base. The strip is adapted to fit over the edge of the first piece and into the groove of the second piece and is formed with inner teeth projecting inward from the sides of the strip so that the teeth poke into the first piece of wood and outer teeth projecting outward from the strip so that the outer teeth poke into the second piece of wood.

5 Claims, 1 Drawing Sheet

STRIP FOR JOINING TWO PIECES OF WOOD

FIELD OF THE INVENTION

The present invention relates to a strip for joining two pieces of wood. More particularly this invention concerns a metallic strip for seating an edge of a wooden panel in a wooden frame or support member and a method of making this strip.

BACKGROUND OF THE INVENTION

It is frequently necessary in the construction of panel doors, cabinet carcasses, wooden I-beams, and the like to seat the edge of a panel made of plywood, pressed board, or the like into a groove in another wooden body that can serve as a support beam or frame. Once the groove has been formed in the support member, it is standard just to apply glue to the panel edge and then fit it into place. Some fasteners such as nails may be applied across the joint to further secure it together.

Such a procedure does not produce a very strong joint between the two pieces unless done with great care. Furthermore the joint can be messy, in particular when any fasteners are not carefully seated and covered.

OBJECTS OF THE INVENTION

It is therefore an object of the present invention to provide an improved system for joining two pieces of wood.

Another object is the provision of such an improved system for joining two pieces of wood which overcomes the above-given disadvantages, that is which allows a panel edge to be seated in a groove in a manner that is not only simple in execution but that also produces a very neat and strong joint.

A yet further object is to provide an improved method of making such a strip.

SUMMARY OF THE INVENTION

An edge of a first piece of wood is secured in a groove formed in a second piece by a joining strip of U-section with a base and a pair of sides projecting from outer edges of the base. The strip is adapted to fit over the edge of the first piece and into the groove of the second piece and is formed with inner teeth projecting inward from the sides of the strip so that the teeth poke into the first piece of wood and outer teeth projecting outward from the strip so that the outer teeth poke into the second piece of wood.

Thus this strip itself, which is shorter than the depth of the groove so that it is completely hidden in the finished assembly, is secured to the two pieces via teeth that solidly secure them together. In use the strip is simply fitted over the edge of the first piece and then it is forced into the groove, thereby driving the inner teeth into the first piece and the outer teeth into the second piece and completing the assembly. The groove is nominally wider than the panel edge to accommodate the strip.

According to the invention prior to mounting in the groove the sides diverge somewhat away from the base with a space between the inner teeth equal roughly to a thickness of the edge. This facilitates assembly considerably. The outer teeth project from the outer edges of the base generally in line with the strip sides. The inner teeth project along an oblique line, however, so that even if the first piece is installed with its grain perpendicular to the second piece, it cannot be pulled readily out.

The strip according to this invention is made by first cutting into opposite outer edges of a longitudinally elongated metallic strip inverted Y-shaped cuts each having a central Y-leg terminating at the respective outer edge and Y-arms extending inward and terminating along longitudinally extending and transversely spaced fold lines. The Y-arms define with the fold lines triangular sections that are folded along the fold lines in one direction and the sides are folded along the fold lines in the opposite direction until the sections and sides both extend generally perpendicular to a base region defined between the fold lines. Triangular regions defined to each side of each Y-leg are folded outward to form the inner teeth. These triangular regions are folded along fold lines extending obliquely to the longitudinal fold lines.

BRIEF DESCRIPTION OF THE DRAWING

The above and other objects, features, and advantages will become more readily apparent from the following, reference being made to the accompanying drawing in which.

SPECIFIC DESCRIPTION

Figure 1:
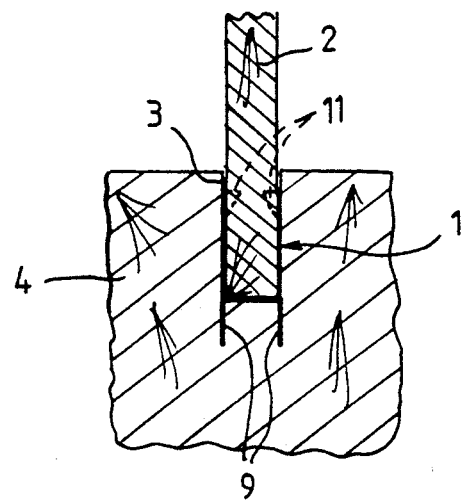
FIG. 1 is a cross section through a joint using the strip of this invention.
Figure 2:
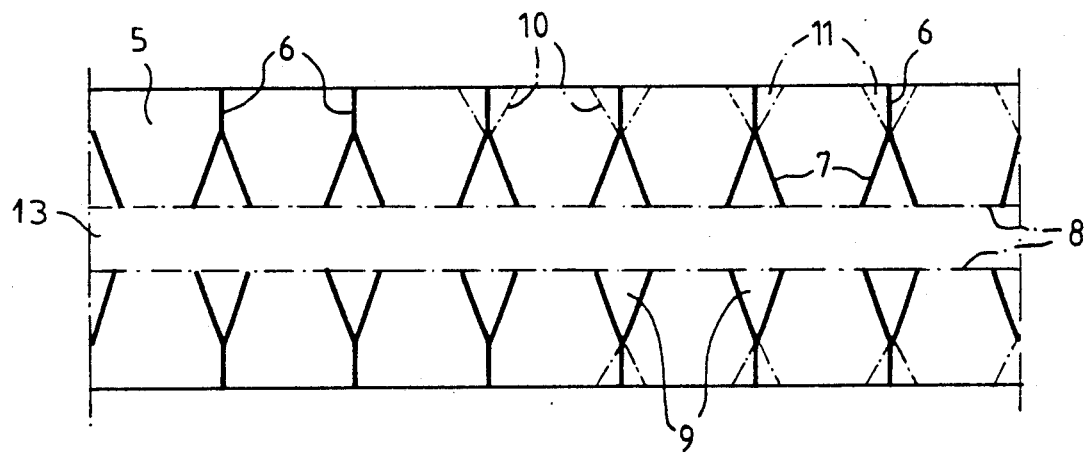
FIG. 2 is a plan view of a portion of a blank from which the joint strip of this invention is made.
Figure 3:
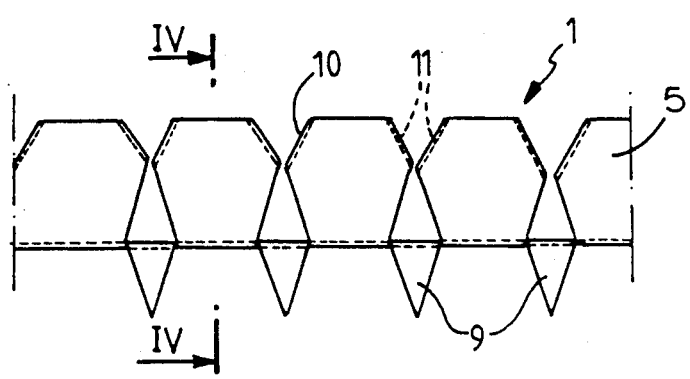
FIG. 3 is a side view of the joint strip.

As seen in the drawing a joint strip 1 is used to seat the edge of a first piece of wood, here a panel 2, into a groove 3 formed in a second piece 4 of wood. The strip 1 is made of metal and is of squared U-section, having a pair of flat sides 5 and a flat floor 13. Triangular teeth 11 project inward from the sides 5 and poke laterally into the panel 2 and teeth 9 project down from the outer edge of the floor 13 into the piece 4.

Figure 4:
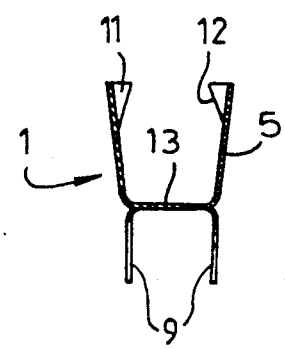
FIG. 4 is a section taken along line IV—IV of FIG. 3.

The strip 1 is made from a flat blank which is formed with perpendicular edge cuts 6 that branch into angled cuts 7, together forming a Y-cut 6, 7. Once the cuts 6 and 7 are formed the sides 5 are bent up along longitudinal fold lines 8 and the triangular sections forming the teeth 9 are bent oppositely down. Then the teeth 11 are formed by bending away the corner regions of the sides 5 along angled fold lines 10 so that the teeth 11 do not extend perpendicular to the floor 13 and so that they have angled edges 12. The sides 5 are not bent up perpendicular to the floor 13 as indicated in FIG. 4 so that the space left between the teeth 11 is about equal to the width of the floor 13, which in turn is generally equal to the panel thickness.

To assemble the joint, the edge of the panel 2 is first seated between the sides 5 in the strip 1. Then the panel edge carrying the strip 1 is forced into the groove 3 in the direction of arrow P. The sides of the groove 3 force the sides 5 of the strip 1 in, causing the teeth 11 to bite into the panel 2. As the panel edge is pushed all the way home in the groove 3, the teeth 9 bite into the floor of the groove 3, completing the assembly.

An outward traction on the panel 2 opposite to direction P will not pull the panel 2 clear of the strip 1, even if its grain runs perpendicular to the groove 3, since the teeth 11 are angled. Thus the panel 2 will be very solidly seated.

I claim:

1. In combination with an edge of a first piece of wood and a second piece of wood formed with a transversely open groove having a longitudinally extending floor, a joining strip securing the edge in the groove, the strip being of U-section with a base and a pair of sides projecting from outer edges of the base, the strip being fitted over the edge of the first piece and into the groove of the second piece with the base lying flat on the floor, the strip being formed with inner teeth projecting inward from the sides of the strip and poking substantially perpendicular to the sides into the first piece of wood, and outer teeth projecting transversely outward from the strip past the base of the strip and into the floor of the groove and poking transversely into the second piece of wood.

2. The strip defined in claim 1 wherein the groove has a predetermined depth that is greater than the height of the sides of the strip, whereby the strip is wholly recessed in the groove.

3. The strip defined in claim 1 wherein prior to mounting in the groove the sides diverge somewhat away from the base with a space between the inner teeth equal roughly to a thickness of the edge.

4. The strip defined in claim 1 wherein the outer teeth project from the outer edges of the base generally in line with the strip sides.

5. The strip defined in claim 1 wherein the inner teeth project inward from the sides from fold lines extending obliquely of the strip.

* * * * *